(12) United States Patent
Bernreuther et al.

(10) Patent No.: US 9,976,557 B2
(45) Date of Patent: May 22, 2018

(54) PUMP HAVING AN INTEGRATED ELECTRONICALLY COMMUTATED DIRECT CURRENT MOTOR

(75) Inventors: Georg Bernreuther, Nürnberg (DE); Thomas Peterreins, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 1293 days.

(21) Appl. No.: 13/641,861

(22) PCT Filed: May 3, 2011

(86) PCT No.: PCT/DE2011/050012
§ 371 (c)(1),
(2), (4) Date: Jun. 17, 2013

(87) PCT Pub. No.: WO2012/048684
PCT Pub. Date: Apr. 19, 2012

(65) Prior Publication Data
US 2013/0266462 A1 Oct. 10, 2013

(30) Foreign Application Priority Data
May 6, 2010 (DE) .................. 10 2010 019 502

(51) Int. Cl.
*F04D 13/06* (2006.01)
*H02K 1/14* (2006.01)
(Continued)

(52) U.S. Cl.
CPC ........... *F04D 13/06* (2013.01); *F04D 13/064* (2013.01); *H02K 1/145* (2013.01); *H02K 5/128* (2013.01); *H02K 7/14* (2013.01); *Y10T 29/49002* (2015.01)

(58) Field of Classification Search
CPC .... F04D 13/06; F04D 13/064; F04D 13/0606; F04D 29/426; F04D 29/586; H02K 1/145; H02K 7/14; H02K 5/128; Y10T 29/49002
(Continued)

(56) References Cited

U.S. PATENT DOCUMENTS 6,201,324 B1 * 3/2001 Suzuki .................. H02K 1/145
29/596
2007/0164629 A1 * 7/2007 Namazue ............... H02K 37/14
310/257
(Continued)

FOREIGN PATENT DOCUMENTS

DE 102006021246 A1 10/2007
EP 0591724 B1 12/1995
(Continued)

*Primary Examiner* — Essama Omgba
*Assistant Examiner* — Stephen Mick
(74) *Attorney, Agent, or Firm* — Westerman, Hattori, Daniels & Adrian, LLP

(57) ABSTRACT

A pump with an integral, electronically commutated, direct-current motor (2) with permanent magnetic inner rotor disposed in a wet chamber, which forms with a turbine pump wheel (22) a compact, structural pump-rotor unit (3), a claw-pole stator (9) positioned in a dry chamber (4), the claw-pole stator (9) having four claw-pole plates (6, 6') made of a soft magnetic material, a ring-shaped winding (12) and a claw-pole stator (9) including a soft magnetic back-iron ring (13) mounted on the claw-pole plates (6, 6') and disposed around the winding (12) and a separating can (10), which separates the dry chamber from the wet chamber (5), characterized in that the claw-pole plates (6, 6') and additional claw-pole plates (66, 66') are stamped and bent together, in which a plate strip for the additional claw-pole plates (66, 66') contains a central borehole from a previous work step.

19 Claims, 5 Drawing Sheets

(51) Int. Cl.
*H02K 5/128* (2006.01)
*H02K 7/14* (2006.01)

(58) Field of Classification Search
USPC .............. 417/423.1, 423.7, 423.11, 423.14
See application file for complete search history.

(56) References Cited

U.S. PATENT DOCUMENTS

| | | | |
|---|---|---|---|
| 2007/0286753 A1* | 12/2007 | Ihle | H02K 1/145 |
| | | | 417/423.7 |
| 2008/0007126 A1* | 1/2008 | Popov | H02K 1/145 |
| | | | 310/49.02 |
| 2008/0031748 A1* | 2/2008 | Ihle et al. | F04D 29/026 |
| | | | 417/321 |
| 2010/0117494 A1* | 5/2010 | Hasegawa | H02K 19/22 |
| | | | 310/67 A |

FOREIGN PATENT DOCUMENTS

| | | |
|---|---|---|
| EP | 1850449 A2 | 10/2007 |
| JP | 2005151741 A | 6/2005 |
| JP | 2009005466 A | 1/2009 |
| JP | 2009055750 A | 3/2009 |

* cited by examiner

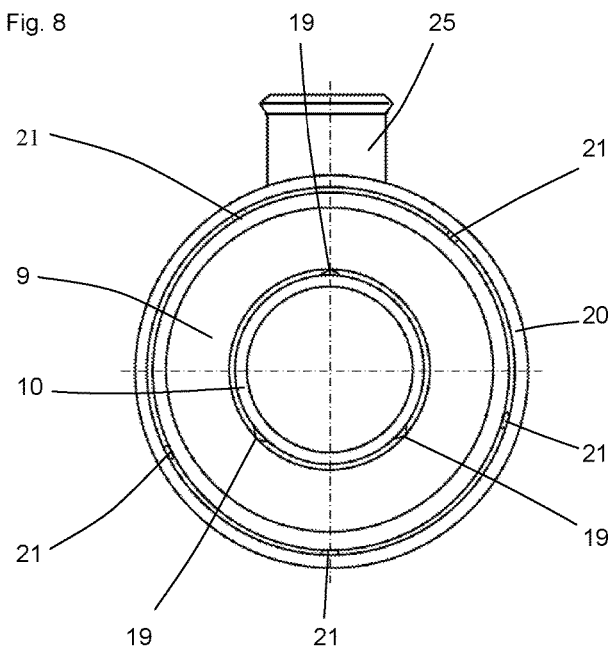
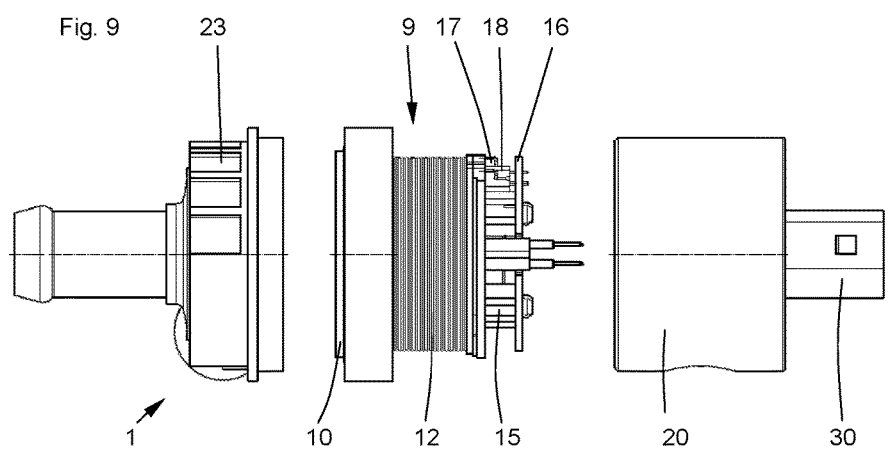

PUMP HAVING AN INTEGRATED ELECTRONICALLY COMMUTATED DIRECT CURRENT MOTOR

BACKGROUND OF THE INVENTION (1) Field of the Invention

The invention concerns a pump with an integral electronically commutated, direct-current motor with an inner, permanent-magnetic rotor disposed in a wet chamber, which forms a compact structural pump-rotor unit with a turbine pump wheel, a claw-pole plate made of a soft magnetic material disposed in a dry chamber or dry space, a ring-shaped winding, and a soft magnetic, return or back-iron ring mounted on the claw-pole plate and disposed around the winding, including a claw-pole stator and a can like partition wall that acts as a containment shell to separate the dry chamber from the wet chamber or wet space.

(2) Description of Related Art Including Information Under 37 CFR 1.974 and 1.98

Such a pump is known from German patent DE 10 2006 021 246 A1, which is provided with a claw-pole stator consisting of two claw-pole plates with paraxial claws gripping one another, forming opposing poles. Because the claw-pole plates are each made of a single, soft magnetic plate, the stator turns out to be in saturation, primarily in the area of the axial stator ends with higher voltage applied at the winding, whereby the performance of the pump is limited. Claw-pole stators are distinguished by simple fabrication, low weight, and sturdiness. Hence, in many cases, it excludes the use of armature stators, with a plurality of single-pole windings and a plated stator set, in particular in use as a supplementary water pump in a vehicle.

BRIEF SUMMARY OF THE INVENTION

The task of the present invention is hence to produce a pump with which higher efficiency and performance are attainable than with conventional claw-pole stators and whose advantages can thereby be essentially maintained, in particular low weight, simple design, and therewith economical fabrication and sturdiness.

This task is achieved according to the invention by increasing the cross-section of the soft magnetic poles of the four claw-pole plates, whereby the claw-pole plates can carry a greater magnetic flux. The basic design is changed only insubstantially compared with the successful execution. Furthermore, it is possible to operate the pump with a single stator coil. Due to the different lengths of the claw poles, weight can be saved without changing the basic design. Due to the use of long claw poles, a greater pole surface is usable. The higher performance achieved justifies the higher manufacturing costs required for this. The shorter claw poles can be manufactured by conventional and economically very favorable methods, namely by stamping out of a sheet-metal plate and by the distortion of the sheet-metal plate. Due to the identical radius in the transition region, a smaller free space remains between the two claw-pole plates, whereby it is ensured that the two claw-pole plates can fit very close to one another.

Because the length of the claw poles in the paraxial direction are disposed at a radial distance farther away from the pump axis of the pump rotor unit and are less than the radius of the same inscribed circle, the additional weight of the shorter claw poles can, at the same time, be limited for greater weight efficiency.

It has been shown that the shorter claw poles fulfill the assumptions cited with a claw-pole surface between 40% and 75% and/or lengths of 30% to 60% of the longer claw poles. However, the pole surfaces of the shorter claw poles can be between 30% and 100% of the pole surface of the longer claw poles. Additionally, the length of the shorter claw poles parallel to the pump axis can be 30% to 100% of the length of the longer claw poles.

It can be advantageous to choose the plate thickness of the shorter claw poles to be less than the plate thickness of the longer claw poles, if the required performance is thereby attainable. Thus more weight is saved, and manufacture is possible even more economically.

In order to keep eddy-current losses in the stator as small as possible, it is proposed to provide the surfaces of the claw-pole plates adjacent to one another with an insulating layer. The usual varnish layers are suitable here, such as are also suitable for sets of plates. With plates that lie on top of one another in the magnetic circuit, vibrations can occur which cause unacceptable noise. In order to avoid or at least clearly limit this effect, it is proposed that the claw poles of a claw-pole plate be conically deformed to a slight extent in the pre-assembled state, insofar as a shift back to a parallel axis is possible within the elastic region and the deformed claw poles are moved back in the assembled state at least partially in the direction of the parallel axis and in this position are connected to adjacent like-pole (homopolar) claw-poles by a mechanical load. The mechanical load prevents the claw poles from swinging free and thus being able to cause noise. Additionally, the fastening is reinforced by nippling, gluing, or spot-welding. It is also possible to manufacture the mechanical load by joining the claw-pole plates to one another.

Because the claw-pole plate with the longer claw poles is assumed, as a rule, to have the higher magnetic flux, it is important to close the magnetic circuit above these plates with the magnetic return or back-iron ring to be as loss-free possible. Hence, in order to keep tolerance-conditioned air gaps as small as possible, the claw-pole ring with the shorter claw poles exhibits an insignificantly smaller outside diameter than the claw-pole ring with the longer claw poles. For this, a diameter difference of less than 0.1 mm is used. Consequently, it is ensured that the back-iron ring preferably fits the ring with the larger diameter and the greater magnetic flux.

In order to improve the sturdiness of the stator unit and to minimize body noise-transmission, it is proposed that a plastic shaped body be connected to at least one ring of a claw-pole plate on one side facing away from the winding, that it exhibit reception means for a conductor plate and a cut clamp connector, in which the plastic shaped body is manufactured by injection molding, and that the four claw-pole plates be at least partially enclosed and fastened, whereby the stator forms a compact ring body, which fits the split tube only above rib-like and/or burl-like areas.

BRIEF DESCRIPTION OF THE DRAWINGS

An embodiment example of the invention is explained in detail hereinafter using the drawings. These show.

DETAILED DESCRIPTION OF THE INVENTION

Figure 1:
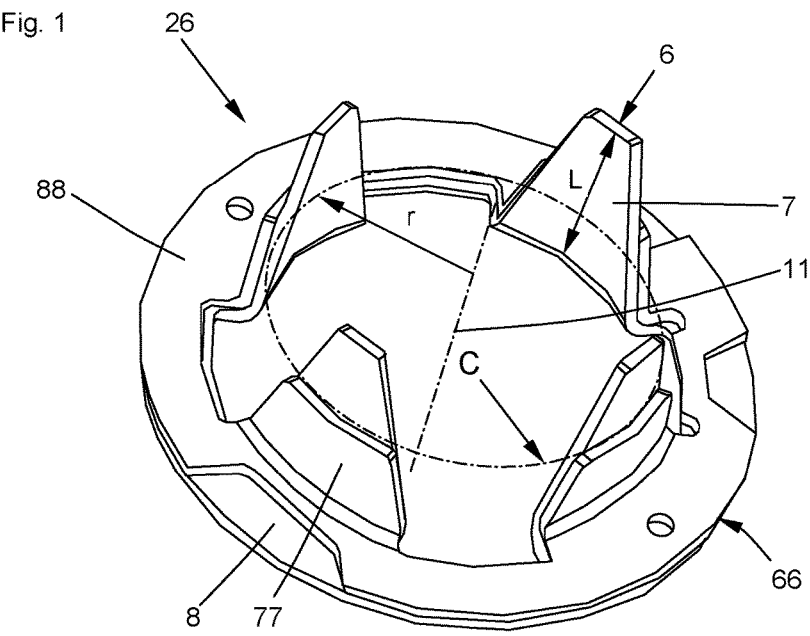
FIG. 1, one of two different claw-pole plates consisting of a partial stator core, FIG. 2, one of two partial stators from the FIG. 1 combined stator core, FIG. 3, another illustration of two partial stators from another perspective, FIG. 4, another illustration of the claw-pole plates according to claim 1, FIG. 5, an illustration of FIG. 4 from another perspective, FIG. 6, a sectional view of a pump, FIG. 7A, a detail view of a variant of the claw-pole plates, FIG. 7B, a detail view of another variant of the claw-pole plates, FIG. 8, a body-noise-minimizing stator shot, FIG. 9, an exploded view of parts of the pump, and FIG. 10, a further exploded view of the pump.
Figure 4:
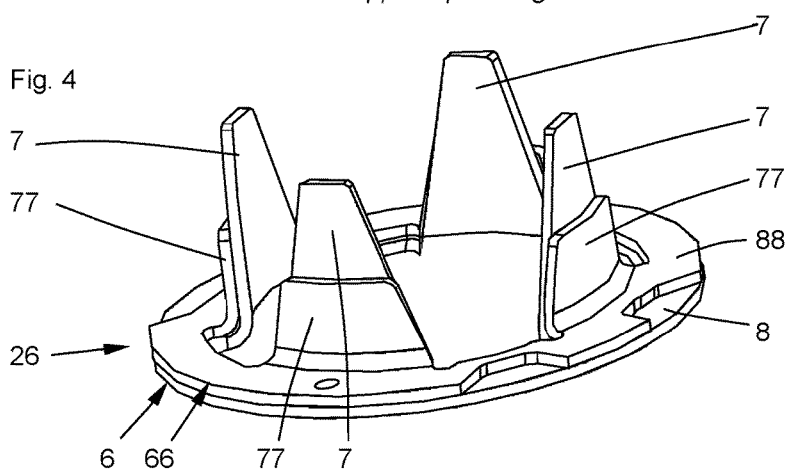
Figure 5:
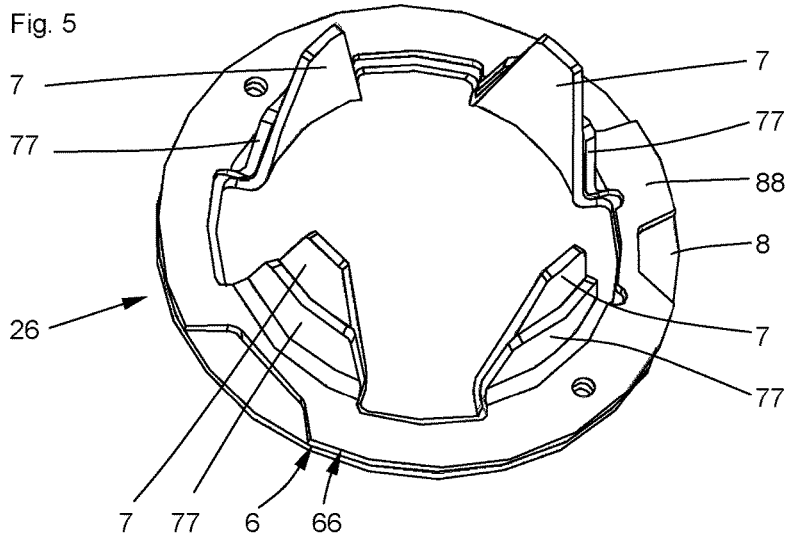

FIGS. 1, 4, and 5 show one partial stator core 26 made up of two different claw-pole plates 6, 66. The differences in the claw-pole plates 6, 66 consist essentially of different radii for the inscribed circle of the claw poles 77. Both claw-pole plates 6, 66 exhibit a ring 8, 88, from which by means of a bend radius R1, R2 (FIG. 7) the claw poles deviate about 90.degree. and run parallel to a central pump axis 11, shown in broken lines. The claw poles 7, 77 are trapezoidal in their basic form in the present example. The claw poles 7, 77 each exhibit like poles (homopolar). Both of the rings 8, 88 and the claw poles 7, 77 are large areas adjacent to one another. The claw poles 7, 77 are aligned parallel to the central pump axis 11.

Figure 2:
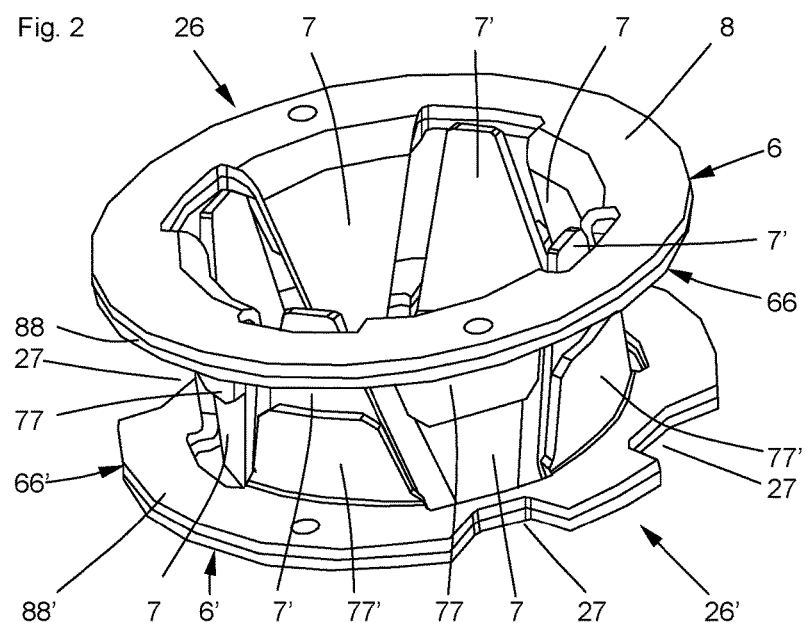
Figure 3:
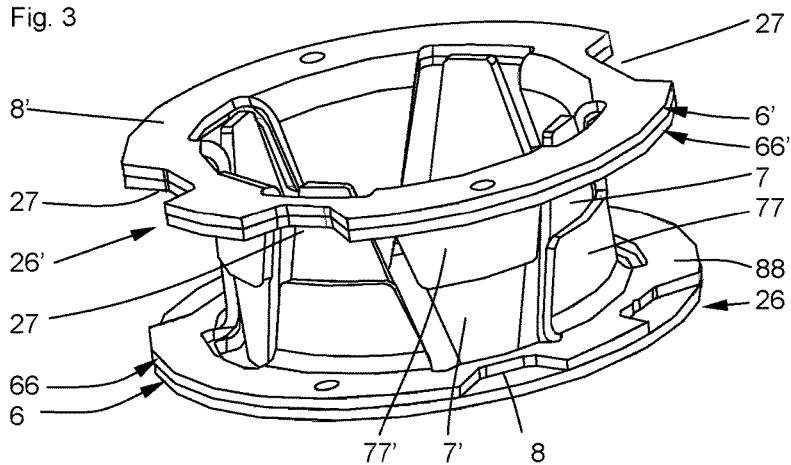

FIGS. 2 and 3 show one combined stator core made up of two partial stators 26, 26', in which the trapezoidally constructed claw poles 7, 7', 77, 77' fit inside one another respectively under air-gap loading and consequently forms a north and a south pole alternating over the circuit. Both of the partial stator cores differs due to recesses 27, which serve as breaches for the winding connections and as distortion insurance.

Figure 6:
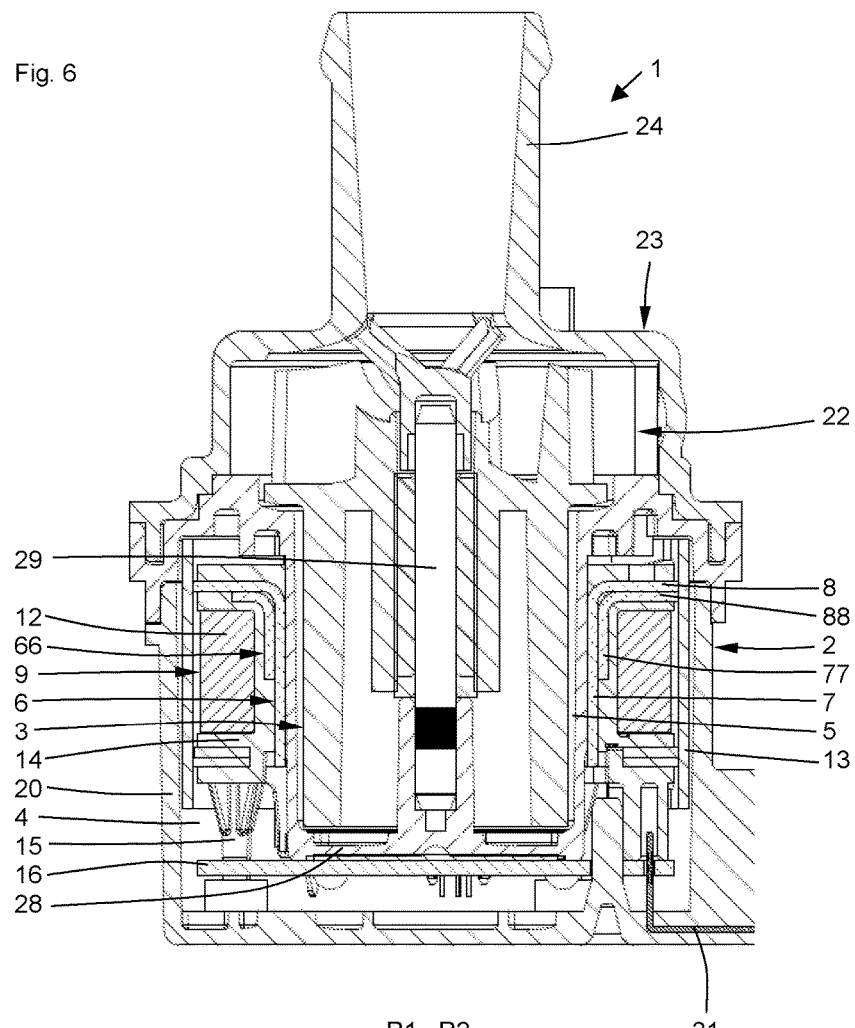
Figure 10:
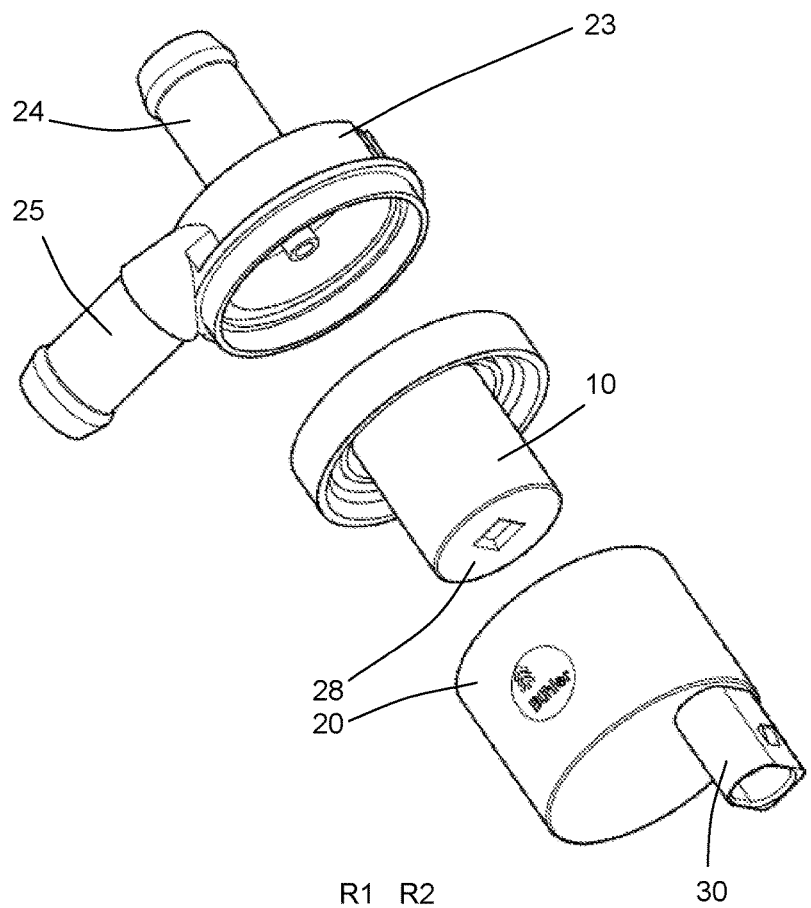

FIG. 6 shows a sectional view through the pump and the integral, electronically commutated direct-current motor, with the stator plates 6, 66, consisting of the claw poles 7, 77 and the rings 8, 88, in which these are embedded in a plastic shaped body 14, which is manufactured by injection molding of the claw-pole plates. The plastic shaped body is a stand-alone component, which serves as a coil body for a winding 12. The plastic shaped body 14, together with the winding and a back-iron ring 13, which is firmly connected, by means of shaping the partial areas of the back-iron ring 13, to the rings 8, 88 of the claw-pole plates 6, 66, forms a claw-pole stator 9. The claw-pole stator 9 draws a conductor plate 16 through a mechanical reception means 15, which, on the one hand, is electrically connected to the ends of the winding 12 and on the other hand through a conductor plate 31 to a plug 30 (FIGS. 9,10). The claw-pole stator 9 is disposed around a separating can 10 or containment shell that forms a can-like partition wall and is force-fit connected to the separating can. A motor housing 20, together with the separating can 10, forms a dry chamber 4 into which the claw-pole stator 9 is received and is impermeable to liquids. Within the separating can 10 is a permanent magnetic pump-rotor unit 3, which consists of a motor section and a pump section. The motor section is disposed radially inside the claw poles 7, 77 and exhibits a permanent magnet ring, which is patterned from a plastic-bound magnet material together with a turbine pump wheel 22 and a bearing shaft. The pump-rotor unit 3 is mounted on an axle 29, which on the one hand is fastened to a floor 28 of the separating can 10 and on the other hand is fastened in the pump housing. The pump-rotor unit 3 is located in a wet chamber 5, which is bounded by the pump housing 23 and the separating can 10. The pump housing encloses an axisymmetric pump intake 24 and a pressure connection 25 (FIG. 8), which runs radially to the pump axis 11. The permanent magnet of the pump-rotor unit can also be made of sintered ferrite material, plastic-bound ferrite material, plastic-bound rare-earth material, or pressed rare-earth material. The ring magnet can be composed of segments, also additionally injected with plastic, or surrounded by a metal ring. Also, the pump-rotor unit can be further provided with a soft magnetic back-iron ring.

Figure 7A:
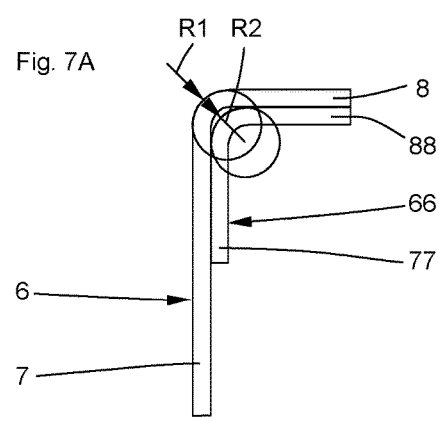
Figure 7B:
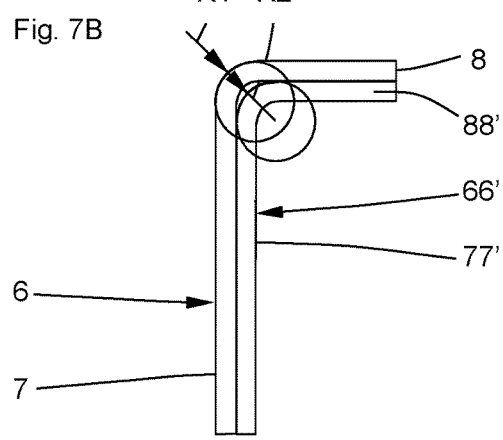

FIG. 7 shows the claw-pole plates 6, 66 in the transition region between the rings 8, 88 and the claw poles 7, 77, which are characterized by radii R1, R2. The radii R1 and R2 are equally large or at least of the same order of magnitude. The shorter claw poles 66 fulfill the assumptions cited with a claw-pole surface between 40% and 75% and/or lengths of 30% to 60% of the longer claw poles 7 (See FIG. 7A). However, the pole surfaces of the shorter claw poles 66' can be between 30% and 100% of the pole surface of the longer claw poles 7 (See FIG. 7B). Additionally, the length of the shorter claw poles 66' parallel to the pump axis 11 can be 30% to 100% of the length of the longer claw poles 6 (FIG. 7B).

FIG. 8 shows how the claw-pole stator 9 is fitted on the separating can 10 and in the motor housing 20. The separating can 10 is one piece with three paraxial ribs 19, onto which the claw-pole stator 9 is pressed. The motor housing 20 is one piece with five paraxial ribs 21, across which the motor housing is drawn up tight to the claw-pole stator 9. The ribs serve to transmit, to a limited extent only, noise produced by the pump-rotor unit, to the motor housing.

FIG. 9 shows an exploded view with the pump housing 23, the separating can 10, the claw-pole stator 9, with the winding 12, the conductor plate 16 which is fastened through the reception means to the claw-pole stator, recesses 17 for the cut clamp connector 18 and cut clamp connector 18 electrically connected to the conductor plate 16 (illustration without back-iron ring) and the motor housing 20 with a plug 30.

FIG. 10 shows a further exploded view of the housing parts of the pump, with the pump housing 23, with the pump intake 24 and the pressure connection 25, the separating can 10 with the floor 28 and the motor housing 20.

To recap, the present invention relates to a pump 1 with integral, electronically commutated, direct-current motor 2 with a permanent magnetic inside rotor disposed in a wet chamber, which forms with a turbine pump wheel 22 a compact structural pump-rotor unit 3, disposed in a dry chamber 4, claw-pole plates 6, 6' made of a soft magnetic material, a ring-shaped winding 12 and a soft magnetic back-iron ring 13 mounted on one of the claw-pole plates 6, 6' and disposed around the winding 12 including a claw-pole stator 9 and a separating can 10, which separates the dry chamber from the wet chamber 5.

The claw-pole stator 9 has four claw-pole plates 6, 66, which includes respectively several connecting claw poles 7, 77 extending parallel to the pump axis 11 and rings 8, 88 disposed at right angles to the pump axis. Two like-pole (homopolar) claw-pole plates 6, 66 and two opposite-pole claw-pole plates 6', 66' interact with the same winding. The like-pole as well as the opposite-pole claw-pole plates each consist of two differently constructed claw-pole plates 6, 66, 6', 66' which are fitted inside one another, so that the claw poles 7, 77, 7', 77' of two like-pole (homopolar) claw-pole plates are a great and different radial distance from the pump-rotor unit but are disposed in the same angular sector, in which the radial difference corresponds to the plate thickness of the claw poles that are closer to the pump-rotor unit.

The length L of each of the claw poles 7, 7' in a direction parallel to the pump axis 11, which are disposed closest to the pump axis 11 of the pump-rotor unit, is greater than the radius r of an inscribed circle C (shown in broken lines) that is bounded by each of the longer claw poles 7, 7'. The bend radii R1, R2 of the claw-pole plates fitted inside one another 6, 66 or 6', 66' in the transition region between the rings 8, 88 or. 8', 88' and the claw poles 7, 77 or 7', 77' are at least approximately equally large, so that between the claw-pole plates 6, 66 or 6', 66' there is a gap in the transition region.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

REFERENCE LIST

1 Pump
2 Direct-current motor
3 Pump-rotor unit
4 Dry chamber or dry space
5 Wet chamber or wet space
6, 66, 6', 66' Claw-pole plates
7, 77, 7', 77' Claw poles
8, 88, 8', 88' Ring
9 Claw-pole stator
10 Separating Can (Containment Shell)
11 Pump axis (shown in broken lines)
12 Annular Winding
13 Back-iron ring
14 Plastic shaped body
15 Reception means for the conductor plate
16 Conductor plate
17 Reception means for cut clamp connector
18 Cut clamp connector
19 Rib-like area
20 Motor housing
21 Ribs
22 Turbine pump impeller
23 Pump housing
24 Pump intake
25 Pressure connections
26, 26' Partial stator core
27 Recess
28 Floor of separating can
29 Axis
30 Plug
31 Conductor plate

What is claimed is:

1. A pump comprising:
an integral, electronically commutated, direct-current motor with a permanent magnetic rotor disposed in a wet chamber, which forms with a turbine pump wheel a compact structural pump-rotor unit, the pump-rotor unit being disposed along a pump axis;
a claw-pole stator positioned in a dry chamber, the claw-pole stator having four claw-pole plates, each of which includes a ring disposed at a right angle to the pump axis and integrally formed adjacent claw poles extending parallel to the pump axis;
the four claw-pole plates made of a soft magnetic material;
a ring-shaped winding;
a soft magnetic back-iron ring mounted on at least two of the claw-pole plates and disposed around the ring-shaped winding;
a separating can, which separates the dry chamber from the wet chamber, wherein
two of the four claw-pole plates constitute homopolar claw-pole plates and two of the four claw-pole plates constitute counter-pole claw-pole plates interacting with the ring-shaped winding;
the two homopolar claw-pole plates consisting of two differently constructed claw-pole plates one with longer claw poles than the other, the claw-pole plate with longer claw poles being fitted inside the claw pole plate with shorter claw poles so that the longer claw poles are radially closer to the permanent magnetic rotor than the shorter claw poles; and
the two counter-pole claw-pole plates consisting of two differently constructed claw-pole plates one with longer claw poles than the other, the claw-pole plate with longer claw poles being fit inside the claw pole plate with shorter claw poles so that the longer claw poles are radially closer to the permanent magnetic rotor than the shorter claw poles;
wherein the claw poles of the two homopolar claw-pole plates are of a different radial distance from the pump axis but are disposed in the same angular sector, in which the radial difference corresponds to the plate thickness of the longer claw poles that are closer to the pump axis.

2. The pump according to claim 1, wherein the length of each of the claw poles in a paraxial direction, which are disposed at a radial distance farther away from the pump-rotor unit, is less than the radius of the same inscribed circle.

3. The pump according to claim 1, wherein the pole surfaces of the shorter claw poles is between 30% and 100% of the pole surface of the longer claw poles.

4. The pump according to claim 1, wherein the pole surfaces of the shorter claw poles are between 40% and 75% of the pole surfaces of the longer claw poles.

5. The pump according to claim 1, wherein the length of the shorter claw poles parallel to the pump axis is 30% to 100% of the length of the longer claw poles.

6. The pump according to claim 1, wherein the length of the shorter claw poles parallel to the pump axis is 30% to 60% of the length of the longer claw poles.

7. The pump according to claim 1, wherein the plate thickness of the claw-pole plates with the shorter claw poles is less than or equal to the plate thickness of the claw-pole plates with the longer claw poles.

8. The pump according to claim 7, wherein the plate thickness of the claw-pole plates with the shorter claw poles is less than the plate thickness of the claw-pole plates with the longer claw poles.

9. The pump according to claim 1, wherein the homopolar claw-pole plates fitted inside one another are electrically insulated from one another by an insulating layer.

10. The pump according to claim 9 wherein the insulating layer is a varnish layer.

11. The pump according to claim 1, wherein the claw poles of a claw-pole plate in a pre-assembled state are conically deformed to a slight extent, insofar as a shift back to a parallel axis is possible within the elastic region.

12. The pump according to claim 11, wherein the deformed claw poles in the assembled state are moved back at least partially in the direction of the parallel axis and in this position are connected to the adjacent homopolar claw poles under mechanical load.

13. The pump according to claim 12, wherein the mechanical load is nipping, gluing, or welding.

14. The pump according to claim 1, wherein all radially adjacent homopolar claw poles are spot-welded to one another.

15. The pump according to claim 1, wherein the claw-pole plates are spot-welded to one another through their rings and by at least two spot-welds.

16. The pump according to claim 1, wherein the rings of the claw-pole plates with the shorter claw poles have an outside diameter less than 0.1 mm smaller than the outside diameter of the rings of the claw-pole plates with the longer claw poles.

17. The pump according to claim 1, further comprising:
a plastic shaped body joining to at least one ring of one of said claw-pole plates on one side facing away from the winding, which exhibits reception means for a conductor plate and cut clamp connector, wherein the plastic shaped body is manufactured by injection molding and at least partially enclose and fasten the four claw-pole plates, whereby the stator forms a compact ring body, which fits firmly to the separating can only through rib-like or burl-like areas.

18. The pump of claim 1 wherein the length L of each of the longer claw poles in a direction parallel to the pump axis, which are disposed closest to the pump axis, is greater than the radius r of an inscribed circle C that is bounded by each of the longer claw poles; and
the bend radii of the claw-pole plates fitted inside one another in a transition region between the rings of the two homopolar claw-pole plates and the longer and shorter claw poles of the two homopolar claw-pole plates are at least approximately equal, so that between the two homopolar claw pole plates there is a gap in the transition region.

19. The pump of claim 1 wherein the length L of each of the longer claw poles in a direction parallel to the pump axis, which are disposed closest to the pump axis, is greater than the radius r of an inscribed circle C that is bounded by each of the longer claw poles; and
the bend radii of the claw-pole plates fitted inside one another in a transition region between the rings of the two counter-pole claw-pole plates and the longer and shorter claw poles of the two counter-pole claw-pole plates are at least approximately equal, so that between the two counter-pole claw pole plates there is a gap in the transition region.

\* \* \* \* \*